O. E. MOATS.
EARTH EXCAVATING AND WAGON LOADING MACHINE.
APPLICATION FILED APR. 19, 1916.
1,329,673.
Patented Feb. 3, 1920.
10 SHEETS—SHEET 1.
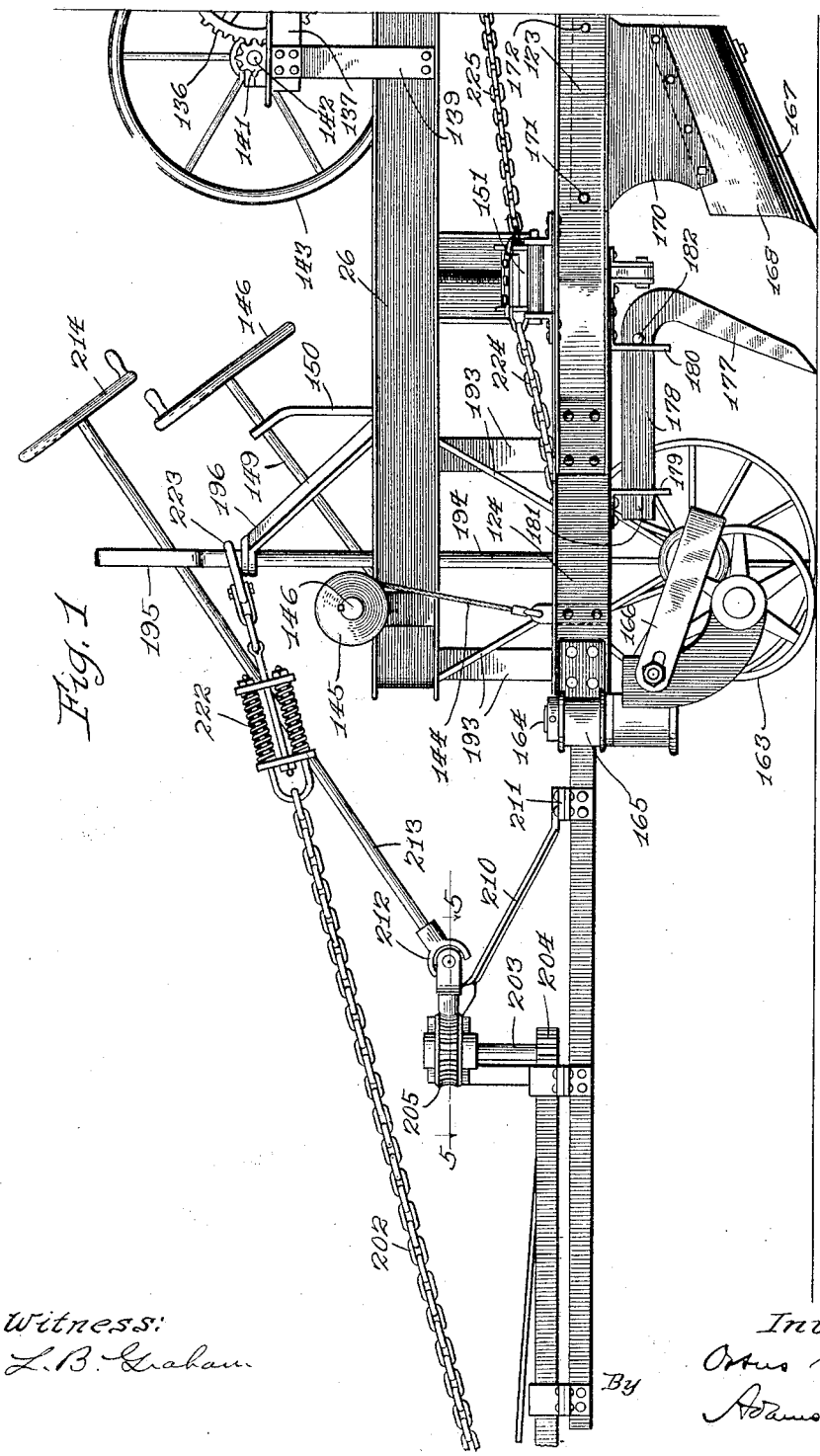

O. E. MOATS.
EARTH EXCAVATING AND WAGON LOADING MACHINE.
APPLICATION FILED APR. 19, 1916.
1,329,673.
Patented Feb. 3, 1920.
10 SHEETS—SHEET 2.
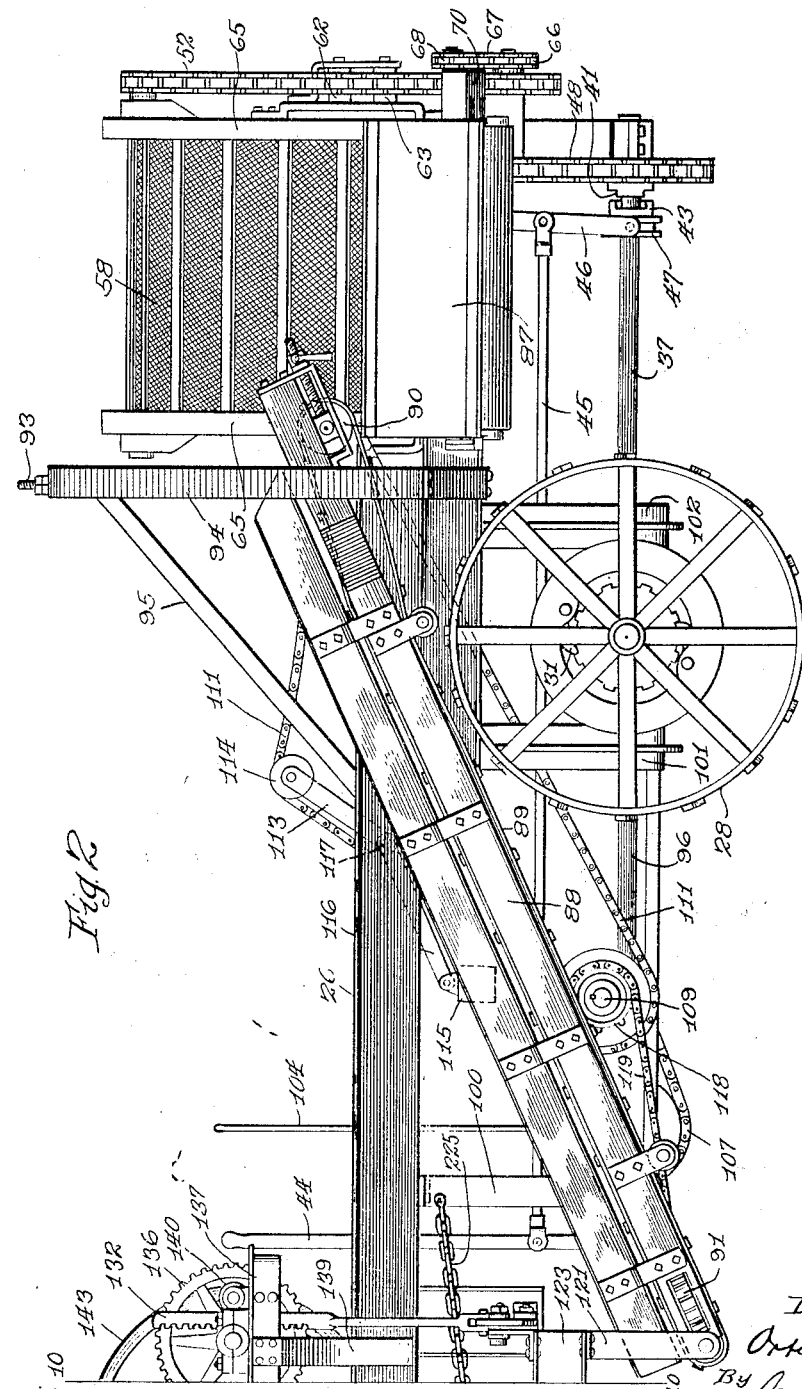

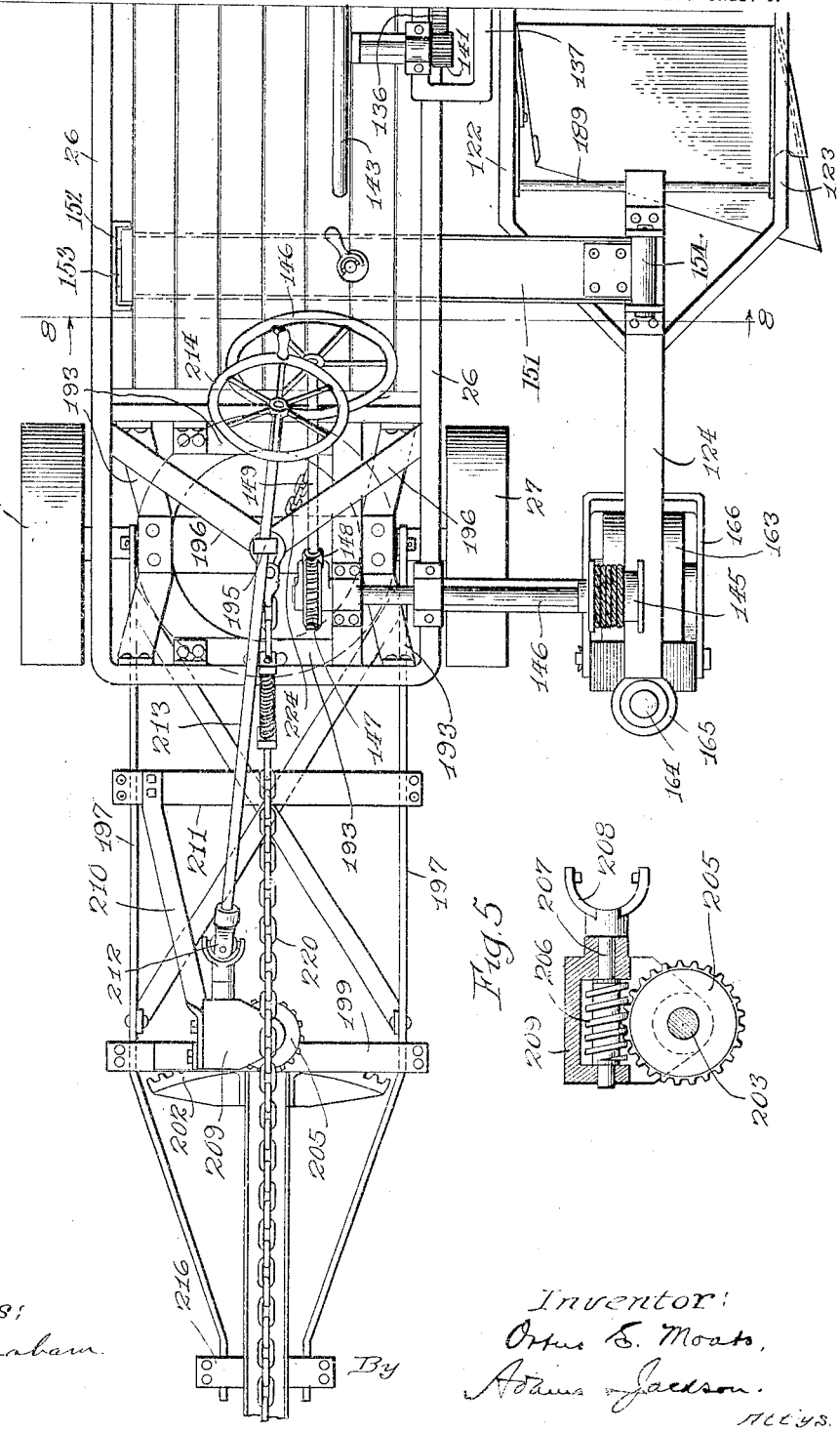

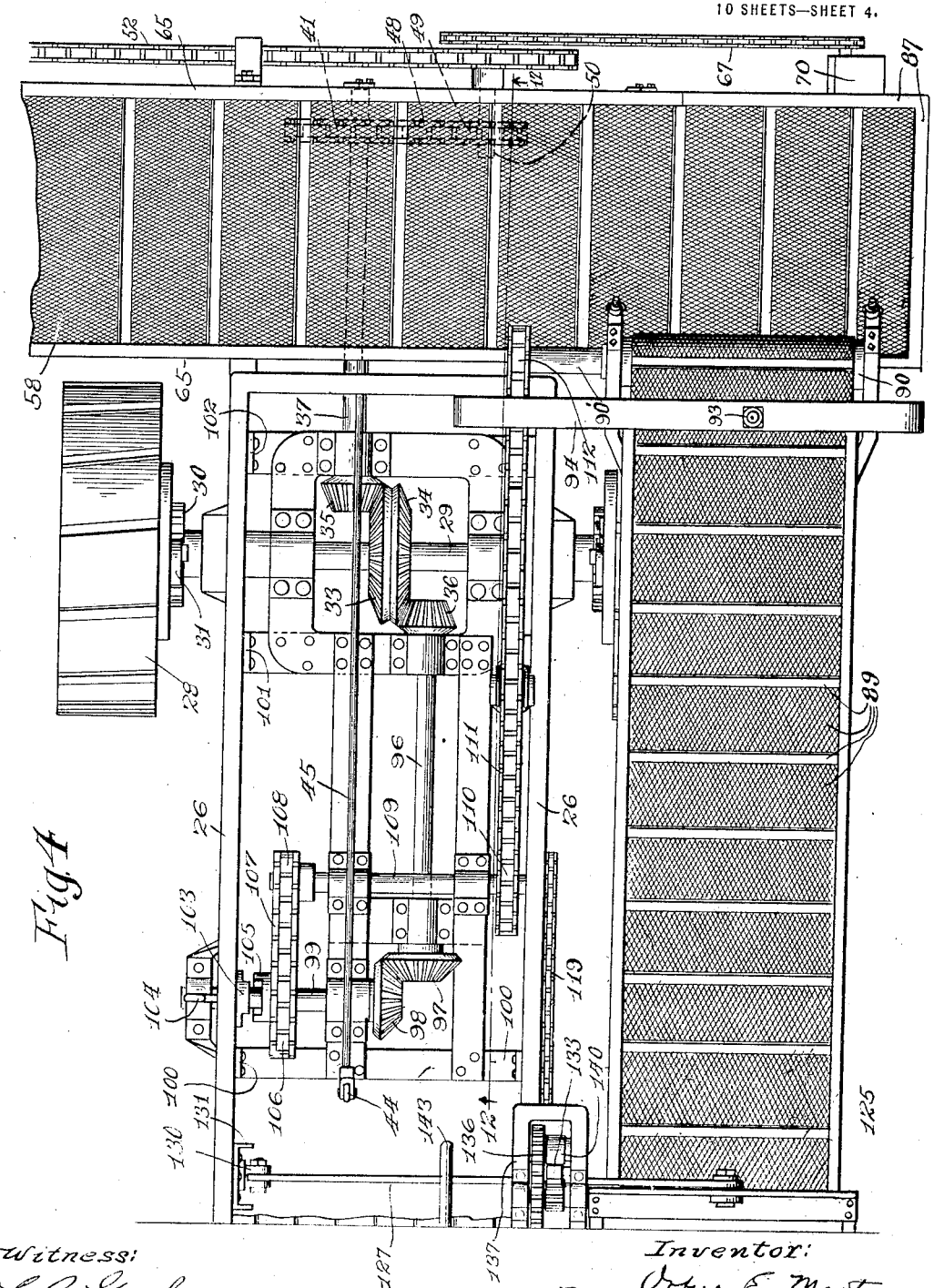

O. E. MOATS.
EARTH EXCAVATING AND WAGON LOADING MACHINE.
APPLICATION FILED APR. 19, 1916.
1,329,673.
Patented Feb. 3, 1920.
10 SHEETS—SHEET 5.
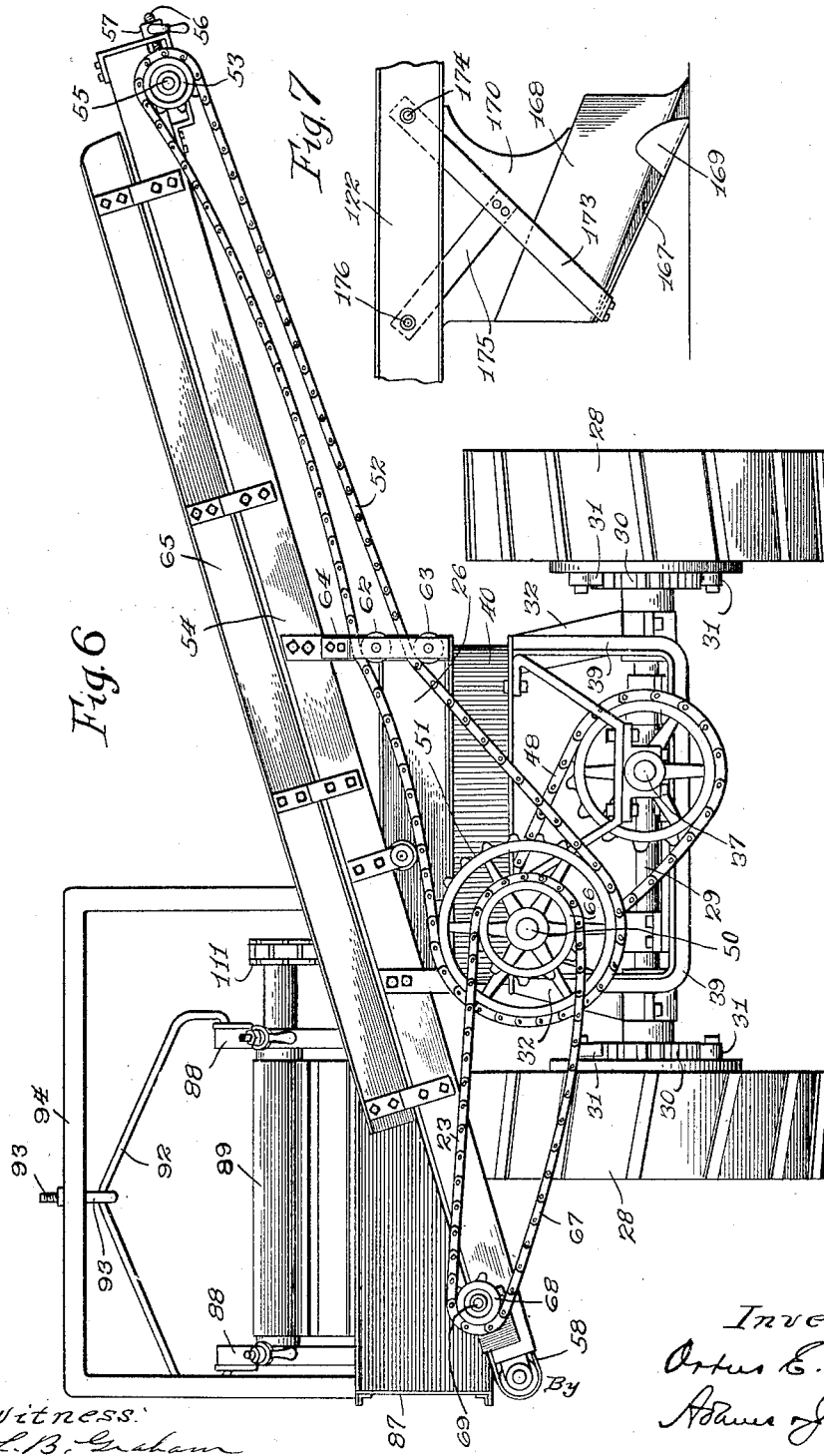

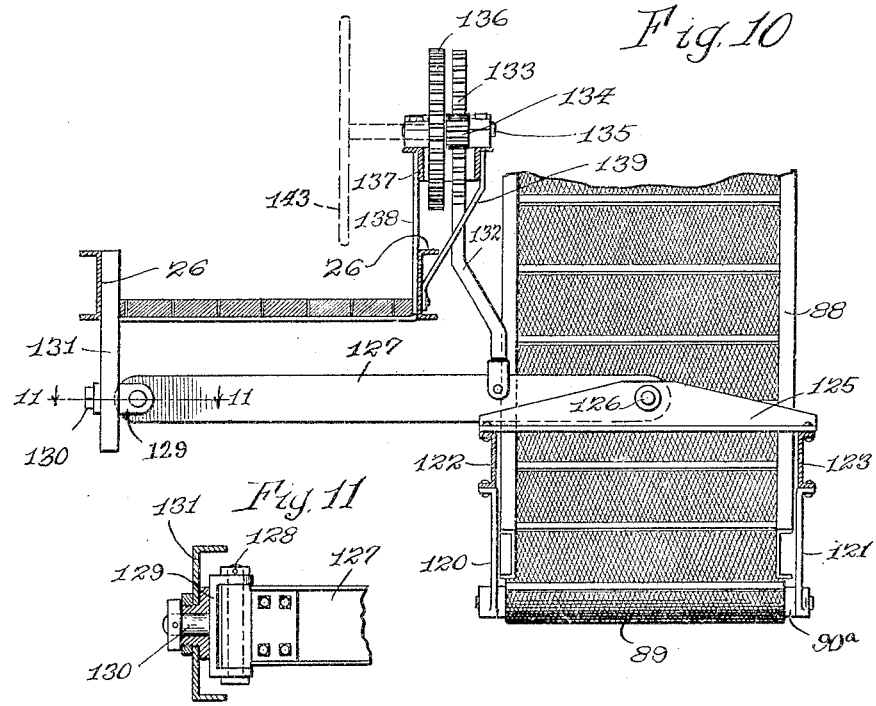
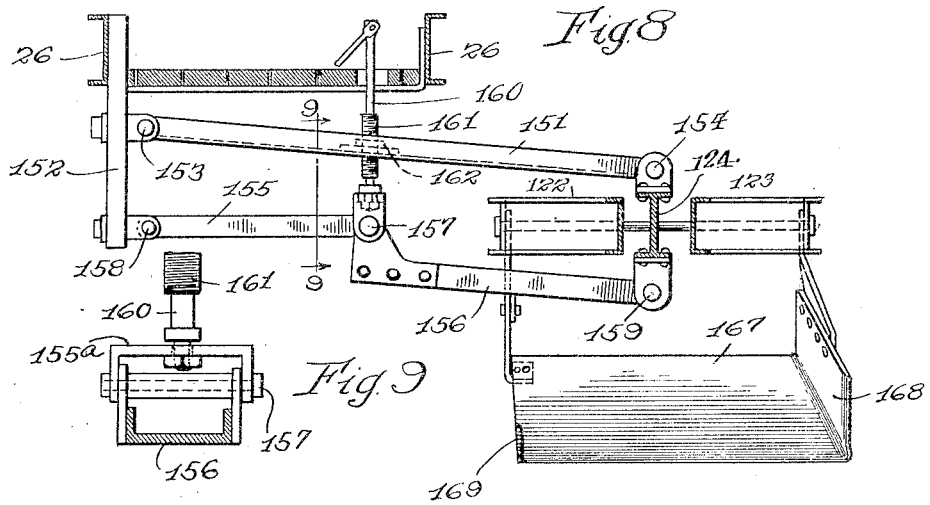

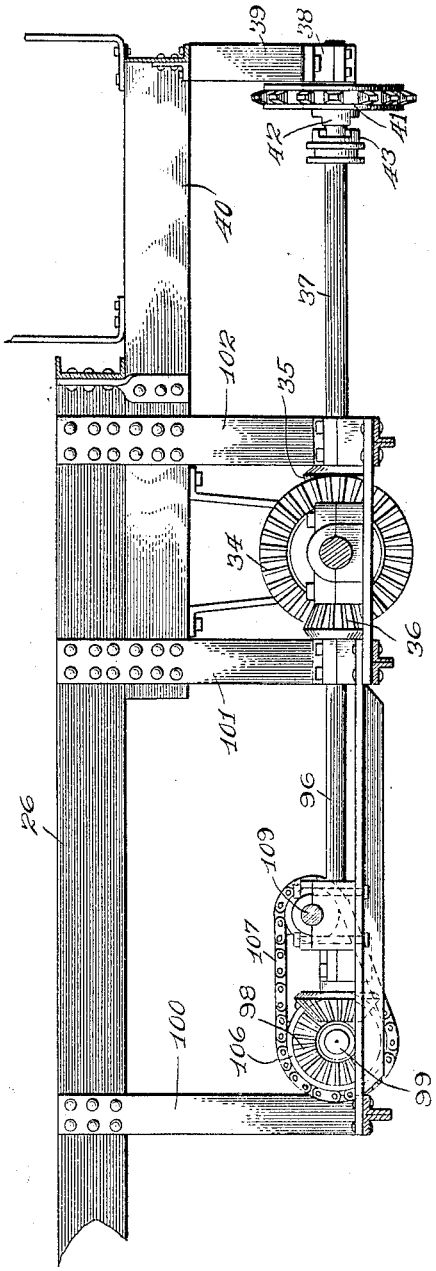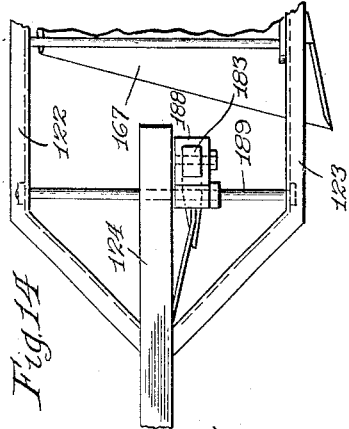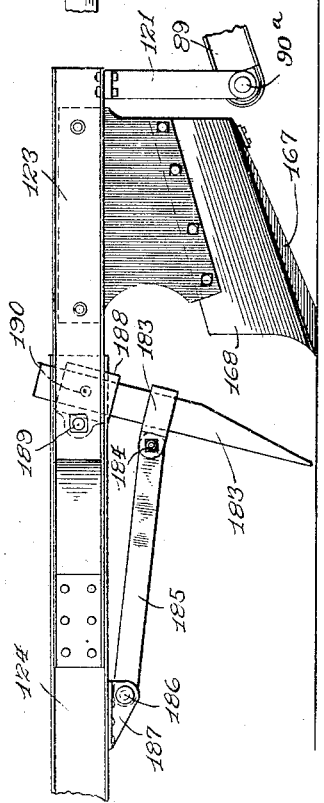

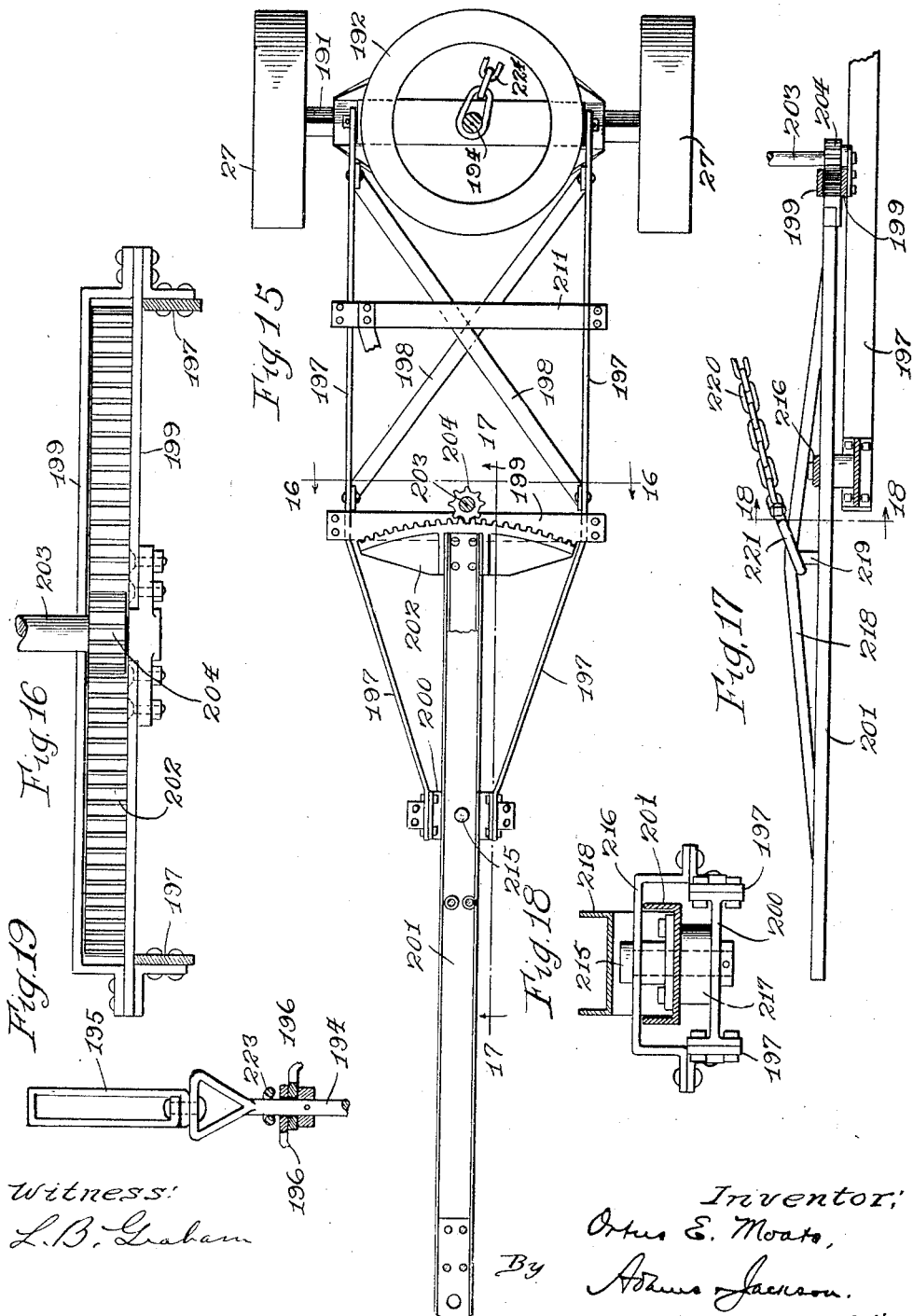

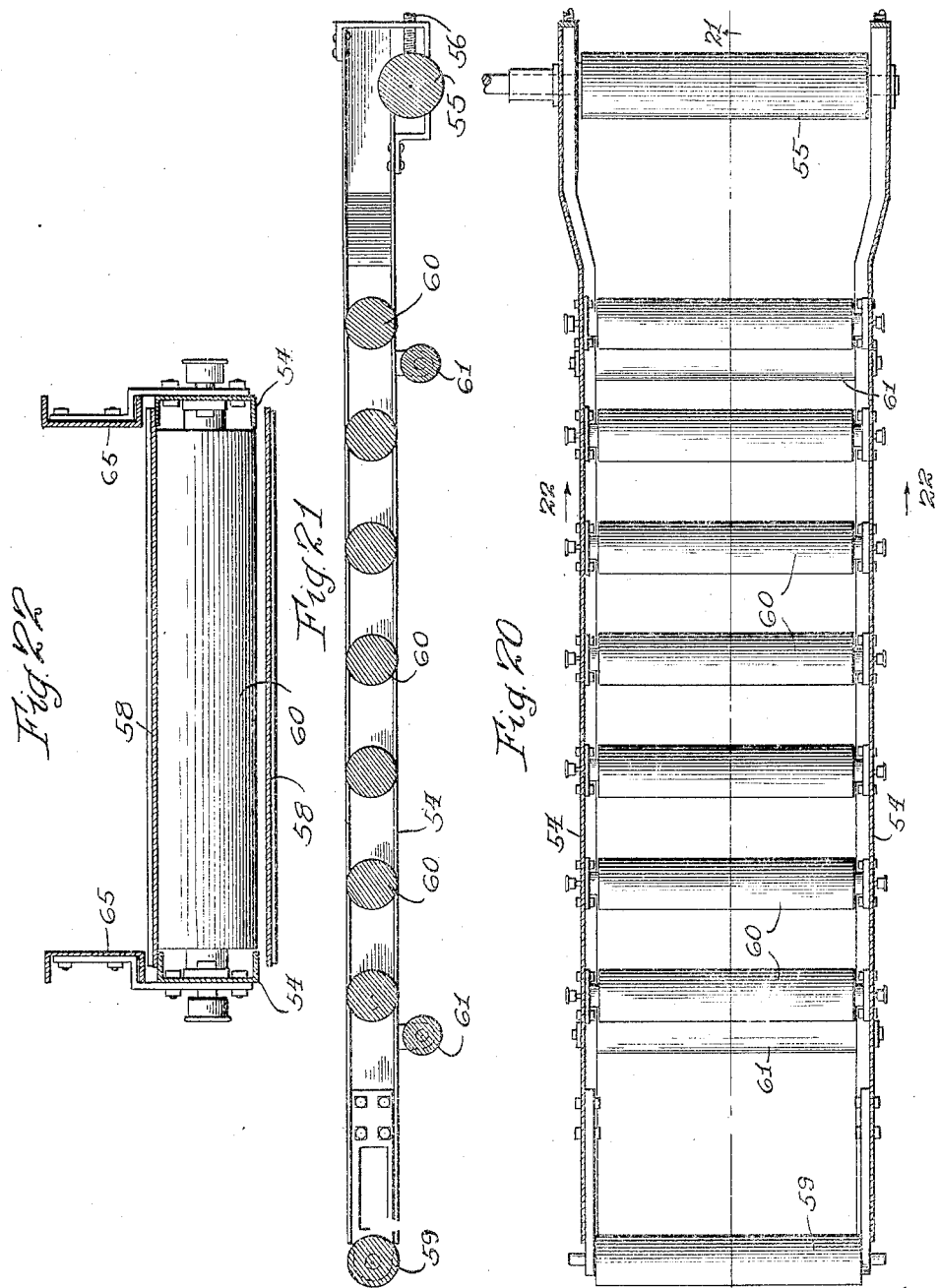

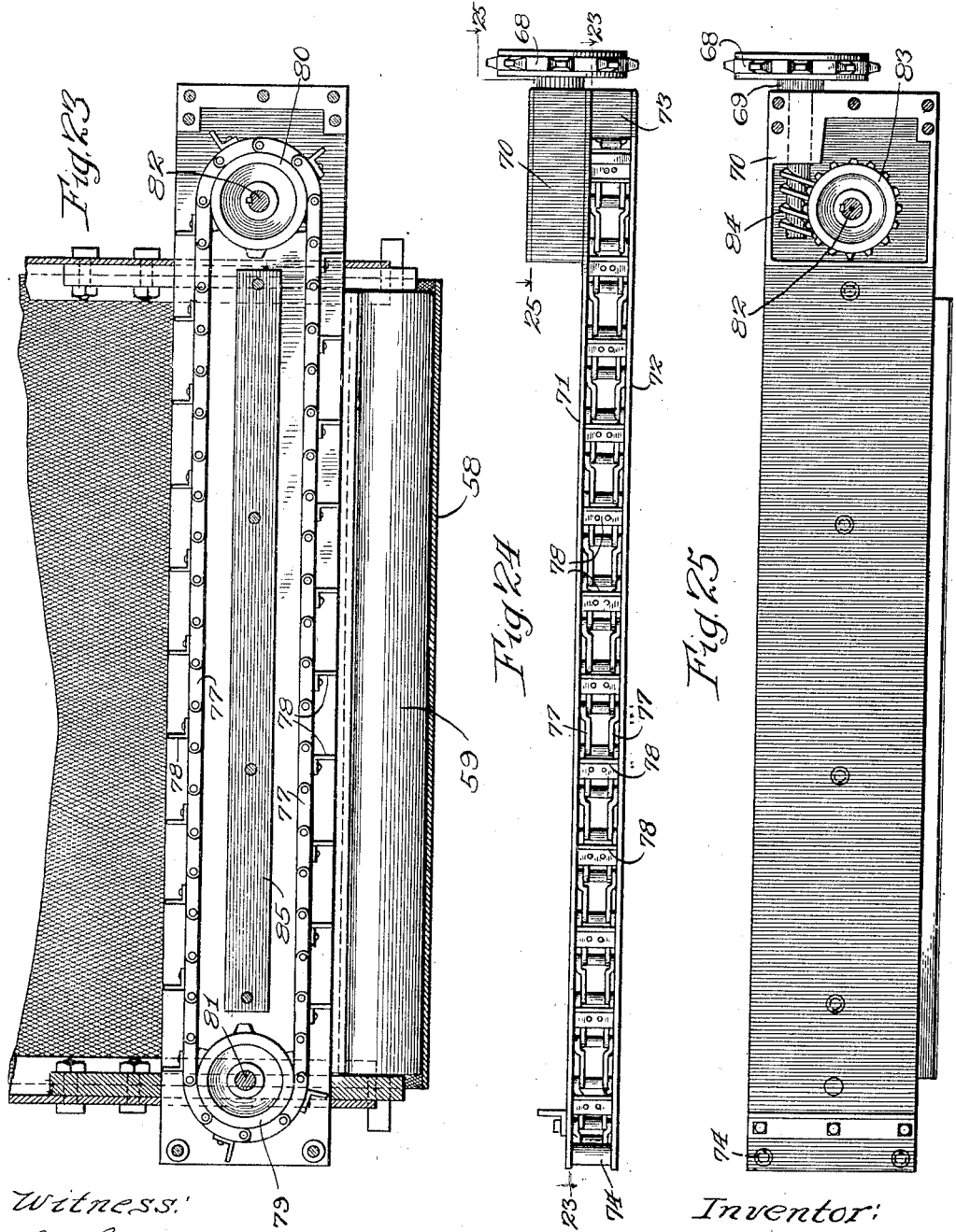

UNITED STATES PATENT OFFICE.

ORTUS E. MOATS, OF CHICAGO, ILLINOIS, ASSIGNOR TO WESTERN WHEELED SCRAPER COMPANY, OF AURORA, ILLINOIS, A CORPORATION OF ILLINOIS.

EARTH-EXCAVATING AND WAGON-LOADING MACHINE.

1,329,673. Specification of Letters Patent. Patented Feb. 3, 1920.

Application filed April 19, 1916. Serial No. 92,123.

*To all whom it may concern:*

Be it known that I, ORTUS E. MOATS, a citizen of the United States, and a resident of Chicago, in the county of Cook and State of Illinois, have invented certain new and useful Improvements in Earth-Excavating and Wagon-Loading Machines, of which the following is a specification, reference being had to the accompanying drawings.

My invention relates to machines for excavating streets, roads, railway cuts, etc., and loading the earth or other material excavated into wagons, and it has for its object to provide a new and improved machine of that class which will be capable of operating successfully in comparatively narrow places, such as narrow streets, alleys, railway cuts, etc.; and also to provide for adjusting the operating parts of the machine so that it may be successfully employed in excavating material from parts of the road difficult of access, and so that the depth of the cut may readily be varied. Further objects are to provide a machine of the requisite strength to enable it to be used to break up and excavate hard ground; to provide an improved construction whereby wagons may be loaded continuously as the machine progresses; to provide means for removing dirt accumulating in the elevating devices; and to improve the construction of machines of this character in sundry other respects which will be hereinafter pointed out. I accomplish these objects as illustrated in the drawings and as hereinafter described. What I regard as new is set forth in the claims.

My improved machine comprises a main wheeled frame provided with a suitable platform for the operator or operators, the devices for steering the machine and for adjusting the several operating parts being disposed conveniently so that they may be readily operated as the machine progresses; excavating devices mounted at one side of the main frame and adjustably supported therefrom; an elevator arranged to receive the materials dug up by the excavating devices and to conduct them to the rear of the machine; a second transversely-disposed elevator coöperating with the first-mentioned elevator to receive and conduct the materials excavated across the rear portion of the machine and discharge them into a wagon located at the opposite side of the machine from the excavating devices; and mechanism operated by forward movement of the machine for driving said elevators. The main frame is provided with draft devices arranged to be turned at an angle relatively to said frame to provide for deflecting the line of excavation toward one side or the other as circumstances may require. It will be understood that machines of this type are usually drawn by traction engines, although that is not essential. The excavating devices comprise a comparatively broad scoop or shovel adapted to dig up the ground to be excavated, said scoop being open at the rear and so associated with one of the elevators that the materials passing up over the scoop fall upon the lower end of such elevator, and a heavy rooter arranged in advance of the scraper for breaking earth too hard to be successfully handled by the scoop. This rooter is made removable, as it is used only where the hardness of the earth requires it. The elevators are similar in construction and consist of endless belts mounted on rollers and driven through suitable gearing operated from the rear axle or from the rear wheels. The elevators are provided near their lower ends with internal scraping devices arranged to remove any dirt accumulating therein which would have a tendency to interfere with their successful operation,—such scrapers consisting of endless belts having suitable scraping devices and arranged to travel transversely of the elevators adjacent to the rollers which support their lower ends, the scraper belts being driven from the same source of power as the elevators themselves. The excavating devices are mounted on a frame which, as has been explained, is supported at one side of the main frame of the machine, and mechanism is provided for rigidly holding the excavating devices in operative position; for rasing and lowering the frame which supports them; and for tipping the excavating devices to an angular position so as to facilitate the making of the first cut in opening up the ground. A caster wheel is also provided to support the forward end of the excavator frame when in operation. The lower end of the elevator upon which the scoop discharges is also arranged to be adjusted vertically so as to maintain its proper position with relation to the scoop. The foregoing are the principal features of my improved machine, which, however, includes various other improved features of construction and operation which will be pointed out in connection with the detailed description of the embodiment of my invention illustrated in the drawings.

In the accompanying drawings,—

Figures 1 and 2, taken together, constitute a side elevation of my improved machine,—Fig. 2 being a continuation to the right of the parts shown in Fig. 1;

Figs. 3 and 4, taken together, constitute a plan view thereof, part of the transverse elevator being broken away,—Fig. 4 being a continuation to the right of Fig. 3;

Fig. 5 is a detail, being a horizontal section on line 5—5 of Fig. 1;

Fig. 6 is a rear elevation;

Fig. 7 is a side view of the scoop, showing the side opposite that shown in Fig. 1, and illustrating also a part of the frame which carries the scoop;

Fig. 8 is a front view of the scoop and the parts which support it, being substantially a cross-section on line 8—8 of Fig. 3;

Fig. 9 is a detail, being a cross-section on line 9—9 of Fig. 8;

Fig. 10 is a partial view of the lower or first elevator, showing the devices by which it is supported, said view being a partial cross-section on line 10—10 of Fig. 2;

Fig. 11 is a detail, being a cross-section on line 11—11 of Fig. 10;

Fig. 12 is a detail showing the gearing by which the elevators are driven, being a partial longitudinal section on line 12—12 of Fig. 4;

Fig. 13 is a partial side elevation of the excavating devices, showing a modified form of rooter and the mounting therefor;

Fig. 14 is a plan view of the parts shown in Fig. 13;

Fig. 15 is a partial plan view, showing the front truck on which the main frame is mounted, and the guiding or steering devices by which the machine may be caused to run off to one side or the other of the line of draft;

Fig. 16 is an enlarged cross-section on line 16—16 of Fig. 15;

Fig. 17 is a partial longitudinal section on line 17—17 of Fig. 15;

Fig. 18 is an enlarged cross-section on line 18—18 of Fig. 17;

Fig. 19 is an enlarged detail, being a view of the upper end of the king-bolt, illustrating the guide for the steering rod carried thereby;

Fig. 20 is a plan view of the first or lower elevator frame, the side bars thereof being in section;

Fig. 21 is a longitudinal section on line 21—21 of Fig. 20;

Fig. 22 is an enlarged cross-section on line 22—22 of Fig. 20;

Fig. 23 is an enlarged detail, being a partial longitudinal section of the upper elevator frame on line 23—23 of Fig. 6, and also a longitudinal section on line 23—23 of Fig. 24, illustrating one of the scraping devices by which dirt is removed from the interior of the elevators;

Fig. 24 is an edge view of one of said scraping devices; and

Fig. 25 is a side view thereof, partly in section, on line 25—25 of Fig. 24.

In the embodiment of my invention illustrated in the accompanying drawings,—26 indicates the main frame, which is preferably rectangular in form and made of channel-iron. This frame is mounted on front wheels 27 and rear wheels 28, the latter being of the type usually employed in traction engines so as to provide sufficient traction to insure the proper operation of the machinery, driven by the rear wheels. In the construction shown, the rear wheels 28 are loosely mounted upon a live rear axle 29, having ratchet-wheels 30 adjacent to the hubs of the wheels 28 adapted to be engaged by pawls 31 secured to the wheels, as shown in Figs. 2, 4 and 6. The purpose of this construction is to permit the wheels 28 to turn backward without driving the shaft 29 and to permit the machine to turn readily. Any other suitable construction for this purpose may be employed. The rear portion of the machine frame 26 is mounted upon the rear axle 29 by bolsters 32, shown in Fig. 6. As shown in Fig. 4, the rear axle 29 carries two oppositely-disposed beveled gears 33—34 which are keyed to said axle so as to rotate therewith. 35 indicates a beveled pinion which meshes with the beveled gear 33; and 36 indicates a beveled pinion which meshes with the beveled gear 34. The pinion 35 is mounted upon a shaft 37 which extends toward the rear of the machine, as best shown in Figs. 4 and 12, its rear end being journaled in a suitable bearing 38 provided in a stirrup-like hanger 39 which is secured to and depends from a frame 40 which is secured to the rear end of the main frame 26, preferably at the under side thereof, and extends for a considerable distance rearwardly therefrom, as best shown in Fig. 12. The purpose of this rear frame is to support the transverse elevator and other parts of the machine, as will hereinafter appear. 41 indicates a sprocket-wheel loosely mounted upon the rear end portion of the shaft 36 and having a clutch-member 42 at one side thereof adapted to be engaged by a clutch-member 43 mounted on a feather on the shaft 37, so that by moving said clutch-member 37 the sprocket-wheel 41 may be operatively connected with said shaft or may be disconnected therefrom, at pleasure. As shown in Fig. 2, the clutch-member 43 is adapted to be shifted by means of a handlever 44 located for convenient operation by the operator of the machine and connected by a connecting-rod 45 with a swinging arm 46, which, at its lower end, has a fork adapted to engage a grooved collar 47 which forms a part of the clutch-member 43. The arm 46 is pivoted at its upper end to the frame 40 in any suitable way, the arrangement being such that by operating the lever 44 the clutch-member 43 may be moved toward or from the clutch-member 42, thereby operatively connecting or disconnecting the sprocket-wheel 41 with the shaft 37. The sprocket-wheel 41 drives the transverse elevator at the rear of the machine through certain sprocket-wheels and chains which are best shown in Figs. 4 and 6. As therein shown, 48 indicates a chain which operates on the sprocket-wheel 41 and on a sprocket-wheel 49 mounted on a short counter-shaft 50 suitably supported by the frame 40. Thus the shaft 50 is driven by the sprocket-wheel 49. The shaft 50 carries a large sprocket-wheel 51 which, as best shown in Fig. 6, drives a chain 52 which runs over a small sprocket-wheel 53 mounted at the upper end of the rear elevator frame 54. The sprocket-wheel 53 is mounted upon one end of a roller 55 journaled in suitable bearings at the upper end of the elevator frame 54 and adjustable longitudinally thereof by means of screws 56 and nuts 57, as best shown in Fig. 6,—the purpose of this adjustment being to regulate the tension of the conveyer belt which is driven by said roller. The rear elevator comprises an endless belt 58 running over a series of rollers suitably journaled in the elevator frame 54, the roller 55 being the uppermost one. The construction of the elevator frame is best shown in Fig. 21, in which 59 indicates the roller at the lower end of the elevator frame, and 60 intermediate rollers which support the belt 58 at intervals. 61 indicates rollers carried at the under side of the elevator frame 54 to hold down the upper portion of the chain 52; and 62—63 indicate rollers carried by a bracket 64 depending from the elevator frame 54 over which the upper and lower parts of the chain 52 run, as shown in Fig. 6. It will be apparent from the foregoing description that when the clutch-member 43 is in engagement with the clutch-member 42 and the machine is advancing, the belt of the transverse elevator will be driven so as to carry material delivered upon the lower end thereof up and across the rear end of the machine, where it will be discharged from the upper portion of the belt. As illustrated in Fig. 6, the transverse elevator 54 is of such length and is so disposed that its lower end projects some little distance beyond the left-hand side of the machine frame, viewed from the rear, while its upper end projects an even greater distance beyond the right-hand side of the machine. The arrangement is such that a wagon may be driven along beside the machine, at the right-hand side thereof, under the upper end of the transverse elevator, so that the material discharged from said elevator will be deposited in the wagon as the machine advances. 65 indicates side boards at the sides of the elevator frame 54 to prevent the material being carried by the belt 58 from falling off at the sides thereof.

The shaft 50 is also provided with a sprocket-wheel 66 which drives a belt 67 operating on a small sprocket-wheel 68. The latter sprocket-wheel, as shown in Figs. 6, 23 and 25, is mounted on a shaft 69 disposed transversely of the elevator 54, near the lower end thereof. The shaft 69 is mounted in suitable bearings in a box 70 secured at one side of a plate 71, said plate forming with a parallel plate 72 an open frame, as shown in Fig. 24,—these plates being spaced apart by blocks 73—74. This frame extends transversely of the rear elevator belt 58, and is suitably supported by the elevator frame 54. Between the plates 71—72 is mounted an endless belt 75 carrying scrapers 78 on its outer surface, said belt being mounted upon and operated by sprocket-wheels 79—80, as shown in Fig. 23. The sprocket-wheel 79 is mounted on a shaft 81 journaled in the side-plates 71—72, and the sprocket-wheel 80 is mounted upon a similar shaft 82, disposed adjacent to the box 70 through which it projects, and in which is carried a worm-wheel 83 which meshes with a worm 84 carried by the shaft 69, as best shown in Fig. 25. Thus the rotation of the sprocket-wheel 68 rotates the worm 84 and through it the worm-wheel 83 and shaft 82. The rotation of the latter shaft rotates the sprocket-wheel 80 and drives the scraper-belt 77. The scrapers 78 carried by said belt, moving transversely of the inner surface of the elevator belt 58, adjacent to the lower roller 59, as best shown in Fig. 23, remove any dirt or other material accumulating inside the belt at its lower end, and thereby keep it in proper operative condition. I prefer to strengthen and support the plates 71—72 by an elongated strip or block 85 placed within the scraper-belt 77, as shown in Fig. 23, and secured to said plates. 87 indicates a box-like structure which extends around the lower portion of the elevator frame 54, as shown in Figs. 2 and 6, to direct the material discharged by the lateral or primary elevator, hereinafter described, upon the belt 58.

88 indicates the elevator frame of the lateral or primary elevator, which is similar in general construction to that of the transverse or secondary elevator, having an endless belt 89 supported by rollers in substantially the same way. 90 indicates the upper roller of the elevator belt 89 which is adjustable in the same way as the corresponding roller of the secondary elevator. I also prefer to provide a transverse scraper for the primary elevator, as indicated at 91 in Fig. 2. The primary elevator frame 88 is disposed outside of the machine frame and in the construction illustrated is at the left-hand side of the machine and extends fore-and-aft in an inclined position, as shown in Figs. 2 and 4. Its upper end extends over the lower end of the secondary or transverse elevator to a greater or less extent, as may be necessary to insure the discharge of the materials carried up by the primary elevator on to the secondary elevator belt. As shown in Fig. 6, the upper end of the primary elevator frame is carried by a bail 92 suspended by a hook 93 from a frame 94 which is suitably supported by the main frame 26, as shown in Figs. 2, 4 and 6. 95 indicates a brace for the frame 94. By this construction the primary elevator may be swung to incline it to the horizontal to a greater or less extent, and it also may be adjusted longitudinally, as may be necessary in the operation of the machine. The manner in which the lower end of the primary elevator is supported will be hereinafter described. The primary elevator belt is driven from the rear axle 29 through the beveled gear 34 and pinion 36. The latter pinion is mounted upon a shaft 96, shown in Fig. 4, which carries a beveled pinion 97 meshing with a similar pinion 98 mounted on a shaft 99 journaled in suitable bearings supported by the main frame 26, preferably by hangers 100—101—102, as shown in Fig. 12,—these hangers being connected by longitudinal and cross-bars to form a substantial frame, as illustrated in Figs. 4 and 12. The shaft 99 carries a clutch-member 103 which is mounted on a feather thereon so as to rotate therewith, said clutch-member being adjustable by a lever 104, shown in Figs. 2 and 4. The clutch-member 103 is adapted to coöperate with a clutch-member 105 carried by a sprocket-wheel 106 loosely mounted on the shaft 99, so that by causing the clutch-member 103 to engage the clutch-member 105, the sprocket-wheel 106 may be caused to rotate with the shaft 99. The sprocket-wheel 106 is connected by a chain 107 with a sprocket-wheel 108 mounted on a counter-shaft 109, as best shown in Figs. 4 and 12, the latter shaft carrying a sprocket-wheel 110 over which runs a chain 111 which also runs on a sprocket-wheel 112 which is connected with the upper roller 90 of the primary elevator. As shown in Fig. 4, this upper roller is provided with an extension 90' at one end which carries the sprocket-wheel 112. Thus the roller 90 is driven from the rear axle 29 when the latter rotates in a forward direction. 113 indicates a swinging arm carrying a roller 114 over which the chain 111 runs, as shown in Fig. 2, said arm 113 being counterbalanced by a weight 115 carried by an arm 116 connected to the pivot 117 of the arm 113, as shown in said figure. The weight 115 thereby holds the chain 111 comparatively taut. As shown in Figs. 2 and 4, the shaft 109 extends through the sprocket-wheel 110 and carries another sprocket-wheel 118 over which operates a chain 119 which drives the transverse scraper for the primary elevator, in the same manner as the scraper for the upper or secondary elevator is driven.

The front end of the primary elevator is pivotally supported by straps 120—121 which depend from the side bars 122—123 of a frame arranged at the left-hand side of the machine, as shown in Figs. 3 and 10, the lower roller 90ᵃ of said elevator being journaled in said straps, as shown in Figs. 10 and 13. The members 122—123 are preferably channel-bars and their ends converge and are secured to the intermediate portion of an I-beam 124, as best shown in Figs. 3 and 8. The members 122—123 are connected at the rear by a cross-bar 125, as shown in Fig. 4, and the frame comprising the side members 122—123 is suspended from the main frame of the machine and held in position in the manner shown in Fig. 10. As therein shown, the cross-bar 125 is connected centrally by a pivot 126 with the outer end of a control bar 127, the opposite end of which is connected by a pivot 128 with a yoke 129 and this yoke is connected by a pivot 130 with a bracket 131 depending from one of the side bars of the main frame 26, as best shown in Figs. 10 and 11. The pivot 128, yoke 129 and pivot 130 are arranged to form a universal joint, so that the control bar 127 may turn axially about the pivot 130 or swing about the pivot 128, thus permitting the elevator frame to be adjusted freely within reasonable limits. Also, by pivoting the bar 125 to the bar 127, the elevator frame 88 is permitted to rock to tilt it about its longitudinal axis and change its angular position with relation to a horizontal plane. The purpose of this adjustment will be hereinafter set forth. The bar 127 is normally in substantially a horizontal position, although it may be swung up or down from such position. It is supported by a rack-bar 132, the toothed portion 133 of which engages a pinion 134 mounted on a shaft 135 which also carries a gear 136, as shown in Fig. 10. These parts are mounted in a frame 137 carried by supports 138—139 rising from one of the side bars of the main frame 26, as best shown in Figs. 2 and 10. The rack-bar 132 is held in mesh with the pinion 134 by an idler-wheel 140, as shown in Fig. 2. The gear 136 meshes with a pinion 141 carried by a shaft 142 also supported by the frame 137 and having mounted on it a hand-wheel 143 by which the shaft 142 may be rotated, thereby moving the rack-bar 132 vertically and correspondingly adjusting the position of the horizontal bar 127 and the elevator frame supported by it.

The forward portion of the I-beam 124 is suspended from the main frame 26 by a cable 144, as best shown in Fig. 1, said cable being wound upon a drum 145 mounted on a shaft 146 which extends transversely of the machine, as best shown in Figs. 1 and 3. Obviously, by winding the cable 144 on the drum 145, the forward end of the beam 124 may be raised, and vice versa. In order to provide for conveniently rotating the shaft 146, it is provided at its inner end with a worm-wheel 147, with which meshes a worm 148 carried by a shaft 149, said shaft having a hand-wheel 146 by which it may be rotated, as shown in Fig. 3. 150 indicates a brace for supporting the upper portion of the shaft 149 (see Fig. 1). The rear portion of the I-beam 124 is supported by a horizontally-disposed vertically-swinging control bar 151, the inner end of which is connected to a depending bar 152 by a universal joint 153 similar to the universal joint which connects the bar 127 to the bracket 131. The outer end of the bar 151 is connected by a pivot 154 with the upper portion of the I-beam 124. 155—156 indicate two bars connected together by a pivot 157 to form a sort of knuckle-joint. The opposite end of the bar 155 is connected by a universal joint 158 with the bracket 152, while the outer end of the bar 156 is connected by a pivot 159 with the lower portion of the beam 124. The bars 155—156 together constitute a second control bar which coöperates with the control bar 151 to control the position of the I-beam 124, as by moving the pivot 157 of the bars 155—156 toward or from the bar 151, it will be evident that the I-beam 124 may be turned to a greater or less extent about its own longitudinal axis. To provide for so moving the pivot 157, and adjusting rod 160 is provided, said rod having a screw-threaded portion 161 which engages screw-threads in a block 162 connected to the bar 151. The lower end of said rod 160 is movably connected to the bar 155, by a yoke 155ª, as shown in Fig. 9. Thus, by rotating the rod 160, the pivot 157 may be moved toward or from the bar 151, thereby lengthening or shortening the distance between the pivots 158—159, and consequently turning the I-beam about its own longitudinal axis. This partial rotation of the I-beam 124 is for the purpose of tipping the excavating devices, as will hereinafter appear.

163 indicates a caster-wheel, the vertical spindle 164 of which is journaled in a bearing 165 at the forward end of the I-beam 124, as shown in Fig. 1. 166 indicates a scraper for the caster-wheel, preferably in the form of a U-shaped bar which overlies the upper portion of the caster-wheel and engages the upper rear portion thereof, as shown in Fig. 1. 167 indicates the main excavating device, which is in the form of a scoop or scraper and is supported outside the machine frame and substantially in line with the primary elevator by the I-beam 124 and the members 122—123 which extend rearwardly therefrom at opposite sides of the scraper and support the primary elevator, as shown in Figs. 3 and 13. The scraper and elevator, although held against lateral tilting with relation to each other may be adjusted to vary their longitudinal inclination to each other by reason of the fact that the front end of the elevator is pivotally supported by the rear portion of the side bars 122—123 as hereinbefore described. The scraper 167 is a substantially flat plate or blade having its outer margin—i. e., the margin away from the machine frame—turned up to form a vertical side 168, as shown in Fig. 8. At the opposite margin of said scraper there is an upturned lip 169 adjacent to the forward cutting edge thereof, but this lip does not extend back very far toward the rear edge of the scraper. The purpose of this lip is to cut away the bank at that side of the scoop or scraper if the latter is cutting deeply into the ground. It is not intended to confine the material excavated upon the scoop, as it is desirable that the latter be left open at one side to prevent choking and facilitate the movement of the material excavated back over the scoop to the primary elevator. As illustrated in Fig. 8, the scoop is set in a slanting position so that its point projects laterally beyond the side of the elevator, the object of this arrangement being to provide sufficient clearance so as not to obstruct the elevator, which is disposed immediately back of the scoop, as shown in Figs. 1 and 2, taken together, and in Fig. 13. The scoop 167 is set in an inclined position and is firmly secured to the member 124 by a plate 170 which is secured to the side 168, as shown in Figs. 1 and 7. The upper marginal portion of the plate 170 is pivoted at 171 to the member 123, and the rear end portion of such plate is also secured to said member by a break-pin 172, the purpose being to allow the scoop or scraper to yield in case it meets with some relatively immovable obstacle, such as a rock, a stump, or something of the kind. By making the scoop and plate 170 in two parts, the scoop portion can be separately removed for sharpening purposes without disconnecting the plate 170 from the member 123. The inner marginal portion of the scoop is braced at the rear by a brace 173, the lower end of which is connected to the rear inner portion of the scoop, while its upper end is connected by a pivot 174 to the member 122, as shown in Fig. 7. The brace 173 is itself braced intermediately by a brace 175, the upper end of which is connected by a break-pin 176 with the member 122. Thus the brace 173 may swing backward to allow the scoop to yield under extraordinary strain which might damage it if it could not yield. As best shown in Fig. 1, the bottom of the scoop 167 is set at quite a pronounced angle to the ground so that it enters the ground readily, and the materials excavated are caused to move back over the upper surface of the scoop to the primary elevator upon the lower end of which they are automatically deposited, being then immediately carried up by said elevator and deposited on the secondary or transverse elevator, which carries them across the machine and deposits them in the wagon placed to receive them. In order to break up extremely hard material, such as macadamized road-beds or packed gravel, or to meet conditions where the difficulties of plowing are unusually great, I provide a rooter 177, which, in the construction shown in Fig. 1, is in the form of a heavy pointed share having a shank 178 by which it is secured at the under side of the I-beam 124. The shank 178 is bent at such an angle that it occupies a horizontal position when the share is in operative position, and is supported by brackets 179—180 attached to the under side of the beam 124, said brackets being slotted to receive the shank 178. A cross-key 181 passed through the forward end of the beam in front of the bracket 179 and a pin 182 passed through the shank at the rear side of the bracket 180, hold the rooter in operative position. It may, however, be readily removed by removing the key 181. The shank 178 is shaped to fit the slots in the brackets 179—180, which are non-circular, so that the rooter is held against lateral swinging. This rooter is disposed in front of the scoop 167 so that it breaks up the ground in advance of the scoop. In Fig. 13 I have shown a modified arrangement of rooter, comprising a straight bar 183 pointed at its lower end, said bar being supported by a collar 183 connected by a break-pin 184 with a bar 185 connected by a pivot 186 with a bracket 187 secured at the under side of the I-beam 124; also by a collar 188 pivoted upon a cross-bar 189 which is supported by the members 122—123, as shown in Fig. 14. A bolt 190 passing through the bracket 188 and bar 183 holds the bar 183 against endwise movement. In case the rooter meets with a relatively immovable obstacle, the pin 184 may break or be sheared off, which will permit the point of the rooter to swing backward. This form of rooter is also removable by removing the pin 190.

In operation the rear end of the beam 124 and the side members 122—123 are lowered to the depth at which it is desired to have the excavating devices operate by means of the rack-bar 132. The rooter will then cut into the ground and the materials loosened by it, as well as other material, will be scraped up by the scoop and deposited upon the elevator 89, by which it will be carried up and delivered as hereinbefore described.

The draft devices are best shown in Figs. 1, 3, 15 and 16. As therein shown, the front axle 191 carries the usual fifth wheel 192 on which the front part of the frame 26 is supported by bolsters 193, as shown in Fig. 1. A king-bolt 194 is provided, as usual, but it is extended upward above the main frame 26 and at its upper end is provided with a swiveled upright loop 195, shown in Fig. 19. The upper portion of the king-bolt is braced by braces 196, as shown in Figs. 1 and 3. Secured to the lower member of the fifth wheel 192 is a draft-frame comprising side bars 197, cross-braces 198, and two parallel transverse bars 199 secured to the side bars 197 intermediately of the length thereof. The forward ends of said side bars converge and are secured at opposite ends of a short horizontal I-beam 200, as best shown in Figs. 17 and 18. 201 indicates a tongue, which is preferably a channel beam, and has at its rear end a segmental rack 202, as best shown in Fig. 15. This rack operates between the two cross-bars 199, as shown in Figs. 16 and 17. 203 indicates a worm-wheel shaft, which is supported in a vertical position by the bars 199, midway of the length thereof, and carries a pinion 204 which meshes with the teeth of the rack 202. At its upper end the worm-wheel shaft 203 carries a worm-wheel 205, as shown in Figs. 1 and 5, with which meshes a worm 206 carried by a worm shaft 207 having a fork 208 at its rear end, as shown in Fig. 4. This worm shaft is mounted in a suitable bracket 209 held in position by a brace 210, as best shown in Figs. 1 and 3. The rear end of the brace 210 is connected to a cross-bar 211 secured to the side bars 197. The fork 208 forms part of a universal coupling 212 with which connects a steering shaft 213 which extends back through the slot in the loop 195, as shown in Fig. 1, and carries at its upper end a steering wheel 214. Thus the steering shaft 213 is supported by the king-bolt, but owing to the swiveling of the loop 195 and the fact that the axis of said loop alines with the axis of the king-bolt, the turning of the front axle in steering is not interfered with. The tongue 201 is pivotally connected with the beam 200 by a pivot 215, as best shown in Figs. 15 and 18, said pivot passing through the beam 200 and through a U-shaped crossbar 216 secured to the beam 200. 217 indicates an anti-friction washer between the tongue 201 and the beam 200. 218 indicates a longitudinal truss for the tongue, as shown in Fig. 17, said truss having a strut 219. The truss 218 is also preferably a channel bar, as shown in Fig. 18. By rotating the steering wheel 214, it will be apparent that the worm shaft 203 may be rotated, thereby swinging the tongue 201 to one side or the other about its pivot 215 and changing its angular relation to the longitudinal axis of the machine, thus enabling the operator to cause the machine to run off to one side or the other, as may be desired in its operation. 220 indicates a chain for supporting the outer end portion of the tongue, said chain being preferably connected to the tongue by a loop 221 which embraces the truss 218 and bears against the strut 219, as shown in Fig. 17. The rear end of the chain 220 is yieldingly connected by a spring 222 with a ring 223 fitted upon the lower end portion of the loop 195, as shown in Fig. 1. 224 indicates a chain, the forward end of which is connected to the king-bolt 194 immediately above the fifth wheel 192, its rear end being connected to the control bar 151, as shown in Fig. 1. 225 indicates another chain, which may be a part of the chain 224, and which extends back from the control bar 151 to the bar 100, as shown in Fig. 2. The chain 224 operates to prevent the control bar 151 from swinging back when the excavating devices are in operation, and the chain 225 prevents the side elevator from swinging forward under the action of gravity.

From the foregoing description it will be understood that with my improved machine it is practicable to operate in comparatively narrow streets, cuts, etc., and that the work of digging up or excavating the ground may be very efficiently carried on, as the material taken up by the excavating devices is at once carried up and across the machine and delivered to the wagon placed to receive it. As soon as one wagon is loaded another may be driven to loading position, and the work thus carried on very rapidly. The excavating devices may be raised and lowered to regulate the depth of the cut, and the scoop may also be tilted so as to run its point into the ground in beginning a cut or trench. When this is done, the elevator is adjusted correspondingly, so that the loading of the excavated dirt is not interfered with. By constructing the scoop as shown, with one side open, there is no danger of choking it; and by slanting it outwardly at its forward edge, the bank is always far enough away from the elevator frame so that it does not interfere with it. If it is desired to excavate to one side of the path of the team or tractor by which the machine is drawn, this may be accomplished by turning the tongue at an angle to the frame of the machine by means of the steering wheel in the manner hereinbefore described. There is no danger of clogging the elevators because the scrapers provided within the elevator belts or aprons near the lower rollers which support them, continuously clear out any dirt which finds its way inside the belts.

It will be understood that while I have described with considerable particularity the embodiment of my invention illustrated in the accompanying drawings, many features of my invention pointed out in the claims hereinafter made are generic in character and may be incorporated in machines differing in many details from that shown and described. The claims are therefore to be construed generically except in so far as they are directed to specific details of the construction shown and described.

That which I claim as my invention, and desire to secure by Letters Patent, is,—

1. An excavating machine, comprising a wheeled frame, a beam arranged at one side thereof, an excavating device connected with said beam, and transverse vertically swinging members mounted on said frame and connected with said beam in different horizontal planes.

2. An excavating machine, comprising a wheeled frame, a beam arranged at one side thereof, an excavating device connected with said beam, transverse vertically swinging members mounted on said frame and connected with said beam in different horizontal planes, and means for adjusting one of said members to rock said beam to tilt the excavating device laterally.

3. An excavating and loading machine, comprising a wheeled frame, a beam arranged at one side thereof, an excavating device connected with said beam, transverse vertically swinging members mounted on said frame and connected with said beam in different horizontal planes, and a carrier arranged back of said excavating device and pivotally connected with said beam.

4. An excavating and loading machine, comprising a wheeled frame, an excavating device and a carrier at one side of said frame, and two substantially parallel control bars pivotally connected with said frame in different horizontal planes and adapted to swing vertically, said control bars being also pivotally connected with said excavating device.

5. An excavating and loading machine, comprising a wheeled frame, an excavating device and a carrier at one side of said frame, two substantially parallel control bars pivotally connected with said frame in different horizontal planes and adapted to swing vertically, said control bars being also pivotally connected with said excavating device, and means whereby the angular relation of said control bars to each other may be varied.

6. An excavating machine, comprising a wheeled frame, a beam arranged at one side thereof, an excavating device connected with said beam, transverse vertically swinging members mounted on said frame and connected with said beam in different horizontal planes, and a third transverse vertically swinging member pivotally connected with said beam and with said frame.

7. An excavating machine, comprising a wheeled frame, a beam arranged at one side thereof, an excavating device connected with said beam, transverse vertically swinging members mounted on said frame and connected with said beam in different horizontal planes, means for adjusting one of said members to rock said beam to tilt the excavating device laterally, and a third transverse vertically swinging member pivotally connected with said beam and with said frame.

8. An excavating and loading machine, comprising a wheeled frame, an excavating device and a carrier at one side of said frame, two substantially parallel control bars pivotally connected with said frame in different horizontal planes and adapted to swing vertically, said control bars being also pivotally connected with said excavating device, and a third control bar pivotally connected with said frame and with said excavating device.

9. An excavating and loading machine, comprising a wheeled frame, an excavating device and a carrier at one side of said frame, two substantially parallel control bars pivotally connected with said frame in different horizontal planes and adapted to swing vertically, said control bars being also pivotally connected with said excavating device, means whereby the angular relation of said control bars to each other may be varied, and a third control bar pivotally connected with said frame and with said excavating device.

10. An excavating and loading machine, comprising a wheeled frame, an excavating device and a carrier at one side of said frame, and two substantially parallel control bars pivotally connected with said frame in different horizontal planes and adapted to swing vertically, said control bars being also pivotally connected with said excavating device, one of said control bars being jointed intermediately whereby it may be adjusted angularly with relation to the other control bar.

11. An excavating and loading machine, comprising a wheeled frame, an excavating device and a carrier at one side of said frame, two substantially parallel control bars pivotally connected with said frame in different horizontal planes and adapted to swing vertically, said control bars being also pivotally connected with said excavating device, one of said control bars being jointed intermediately whereby it may be adjusted angularly with relation to the other control bar, and means for adjusting said control bars with relation to each other and for holding them in their different positions of adjustment.

12. An excavating machine, comprising a wheeled frame, a beam arranged at one side thereof, an excavating device connected with said beam, upper and lower substantially parallel control bars pivotally connected with said frame and with said beam, one of said control bars being jointed intermediately, and means carried by the other control bar and connected with said jointed bar for changing the angular relation of said control bars to each other.

13. An excavating machine, comprising a wheeled frame, a beam arranged at one side thereof, an excavating device connected with said beam, upper and lower substantially parallel control bars pivotally connected with said frame and with said beam, one of said control bars being jointed intermediately, and means mounted on the other bar and movably connected with said jointed bar for adjusting the position of said bars with relation to each other.

14. An excavating machine, comprising a wheeled frame, a beam arranged at one side thereof, an excavating device connected with said beam, upper and lower substantially parallel control bars pivotally connected with said frame and with said beam, one of said control bars being jointed intermediately, a screw-threaded rod mounted on the other bar, and a yoke connecting said rod with the joint of said jointed bar for angularly adjusting said bars with relation to each other.

15. An excavating and loading machine, comprising a wheeled frame, a beam arranged at one side of said frame, a carrier back of said beam and pivotally connected therewith, an excavator connected with said beam, and upper and lower transversely disposed control bars pivotally connected with said beam in advance of said excavator, and pivotally connected with said frame.

16. An excavating and loading machine, comprising a wheeled frame, a beam arranged at one side of said frame, a carrier back of said beam and pivotally connected therewith, an excavator connected with said beam, upper and lower transversely disposed control bars pivotally connected with said beam in advance of said excavator and pivotally connected with said frame, and a vertically swinging control bar pivotally connected with said frame and with said beam back of said excavator.

17. An excavating machine, comprising a wheeled frame, a beam arranged at one side thereof, upper and lower transversely disposed control bars pivotally connected with said beam, said control bars being connected to said frame by universal joints, and an excavator connected with said beam.

18. An excavating machine, comprising a wheeled frame, a beam arranged at one side thereof, upper and lower transversely disposed control bars pivotally connected with said beam, said control bars being connected to said frame by universal joints, an excavator connected with said beam, and means for adjusting one of said control bars to turn said beam about a longitudinal axis.

19. An excavating machine, comprising a wheeled frame, a beam arranged at one side thereof, upper and lower transversely disposed control bars pivotally connected with said beam, said control bars being connected to said frame by universal joints, an excavator connected with said beam, one of said control bars being jointed intermediately, and means for adjusting said jointed bar with relation to the other bar to turn said beam about a longitudinal axis.

20. An excavating and loading machine, comprising a wheeled frame, a beam at one side thereof, an excavator connected with said beam, a carrier back of said excavator and pivotally connected with said beam, upper and lower control bars connected with said frame by universal joints and pivotally connected with said beam in different horizontal planes, and a third control bar pivotally connected with the rear portion of said beam and connected with said frame by a universal joint.

21. An excavating and loading machine, comprising a wheeled frame, a beam at one side thereof, an excavator connected with said beam, a carrier back of said excavator and pivotally connected with said beam, upper and lower control bars connected with said frame by universal joints and pivotally connected with said beam in different horizontal planes in advance of said excavator, and a third control bar pivotally connected with the rear portion of said beam and connected with said frame by a universal joint.

22. An excavating and loading machine, comprising a wheeled frame, a beam at one side thereof, an excavator connected with said beam, a carrier back of said excavator and pivotally connected with said beam, upper and lower control bars connected with said frame by universal joints and pivotally connected with said beam in different horizontal planes in advance of said excavator, a third control bar pivotally connected with the rear portion of said beam and connected with said frame by a universal joint, and means connected with said third control bar for vertically adjusting the same.

23. An excavating and loading machine, comprising a wheeled frame, a beam arranged at one side thereof, said beam being unitary at its forward end and forked at its rear end, an excavator secured to the forked portion of said beam, a carrier arranged back of said excavating device and pivotally connected with said beam, and vertically swinging members pivotally connected respectively with said beam in advance of and behind said excavating device and pivotally connected with said frame.

24. An excavating and loading machine comprising a wheeled frame, a beam arranged at one side thereof, the forward portion of said beam being unitary and its rear portion forked, an excavating device secured to the forked portion of said beam, a carrier arranged back of said excavating device and pivotally connected with said beam, upper and lower substantially parallel members pivotally connected at one end respectively with the upper and lower portions of said beam in advance of said excavating device and pivotally connected with said frame, and a vertically swinging member pivotally connected with the rear portion of said beam and with said frame.

25. An excavating and loading machine, comprising a wheeled frame, a beam arranged at one side thereof, a transversely-disposed bar pivotally connected with said wheeled frame and with said beam, an excavating device carried by said beam, means for vertically adjusting said beam, an elevator adapted to receive the materials excavated by said excavating device, and bars having their outer ends pivotally connected respectively with said frame and with said beam, their inner ends being pivotally connected together and adjustably connected with said first-mentioned bar, whereby the axial position of said beam may be varied.

26. An excavating and loading machine comprising a wheeled frame, a beam located at one side of and supported by said frame, a vertically swinging cross-bar connection pivotally connecting said beam to said frame, draft connections comprising a king bolt, and a draft chain extending from said king bolt to said cross-bar connection, excavating means carried by said beam, and an inclined elevator back of said excavating means and extending rearwardly therefrom.

27. An excavating and loading machine comprising a wheeled frame, a beam located at one side of said frame, substantially parallel upper and lower cross-bars pivotally attached to said frame and to said beam, draft connections comprising a king bolt, a draft chain extending from said king bolt to one of said parallel cross-bars, excavating means carried by said beam, and an elevator supported by said frame and arranged to receive material from said excavating means.

28. An excavating and loading machine comprising a wheeled frame, a beam at one side thereof, said beam being forked or divided at its rear end, excavating means pivotally attached to the forked portion of said beam, an elevator arranged back of said excavating means and adapted to receive material therefrom, and a break-pin for normally holding said excavating means in operative position, said excavating means being arranged to swing rearwardly over the lower end of said elevator when said break-pin is sheared off.

29. An excavating and loading machine, comprising a wheeled frame, an inclined elevator supported thereby, and a scoop arranged in advance of said elevator and adapted to discharge upon the lower end portion thereof, said scoop having a vertical side wall at its outer side and being open at its inner side and having an upwardly-projecting lip at its open side near its forward edge.

30. An excavating machine comprising a wheeled frame, a beam connected with said frame, an excavating device carried by said beam, said excavating device comprising a scoop made in two parts one side of said scoop being left open, an upright member attached to said scoop and to the beam for holding the open side of said scoop in horizontal alinement, and a carrier back of said scoop and receiving material therefrom.

31. An excavating machine, comprising a wheeled frame having a pivoted front axle, excavating means at one side thereof and operatively connected therewith, a draft frame connected with the front axle of the machine, a tongue pivotally mounted between its ends upon said draft frame to swing laterally, and means mounted on said wheeled frame and operatively connected with the rear end portion of said tongue for swinging the same laterally.

32. An excavating machine, comprising a wheeled frame having a pivoted front axle, excavating means at one side thereof and operatively connected therewith, a draft frame connected with the front axle of the machine, a tongue pivotally mounted between its ends upon said draft frame to swing laterally, a segmental rack at the rear end portion of said tongue, gearing mounted on said draft frame and meshing with said rack for swinging said tongue laterally, and means mounted on said wheeled frame for operating said gearing.

33. An excavating machine, comprising a wheeled frame having a pivoted front axle, excavating means at one side thereof and operatively connected therewith, a draft frame connected with the front axle of the machine, a tongue pivotally mounted between its ends upon said draft frame to swing laterally, a segmental rack at the rear end portion of said tongue, gearing mounted on said draft frame and meshing with said rack for swinging said tongue laterally, a steering-rod connected with said gearing for operating the same, a king-bolt upon which the front axle is pivoted, and means pivoted in alinement with the king-bolt for supporting the rear portion of said steering-rod.

34. An excavating machine, comprising a wheeled frame having a pivoted front axle, excavating means at one side thereof and operatively connected therewith, a tongue pivotally mounted to swing laterally independently of said wheeled frame, means mounted on said frame for swinging the tongue laterally, and a flexible connection between the outer portion of the tongue and said wheeled frame, said connection being attached to said wheeled frame in alinement with the pivot of the front axle of said frame.

35. An excavating and loading machine, comprising a wheeled frame having a pivoted front axle, a beam at one side of said wheeled frame, a vertically swinging transverse bar pivotally connected with said frame and with said beam, a draft chain connected with said bar and with said frame in line with the pivot of said axle, an excavating device carried by said beam, and an inclined elevator supported by said wheeled frame and arranged to receive material from said excavating device, the lower end of said elevator being pivotally connected with said beam.

36. An excavating and loading machine, comprising a wheeled frame, a carrier outside of said frame and extending longitudinally thereof at one side of the machine, means for supporting said carrier from said wheeled frame, an excavating device disposed at one side of said frame and arranged to deliver material to said carrier, draft devices connected with said frame and adjustable angularly with reference to the longitudinal axis of said frame and independently of the front wheels thereof; and means mounted on said frame for angularly adjusting said draft devices.

37. An excavating and loading machine, comprising a frame having front and rear wheels, a king-bolt for said front wheels, a longitudinally disposed beam at one side of said frame, an excavating device connected with said beam, a carrier back of said excavating device and connected with said beam, two substantially parallel control bars located forward of the excavating device, said bars being connected at one end by hinged joints to said beam and at the other end by universal joints to said frame, a draft connection from said king-bolt to one of said control bars, and a control bar connected at one end with said frame by a universal joint and pivotally connected with said beam back of said excavating device.

38. An excavating and loading machine, comprising a wheeled frame, a longitudinally disposed beam, an excavating device at one side of said machine and supported by said beam, a carrier back of said excavating device and pivotally connected with said beam, two substantially parallel control bars located forward of the excavating device, said bars being connected at one end to the beam by hinged joints and at the other end by universal joints to said frame, a control bar back of said excavating device, one end of the latter bar being connected to said beam by a hinged joint and the other end thereof being connected to said frame by a universal joint, and means pivotally suspending the rear end portion of said carrier.

39. An excavating and loading machine, comprising a wheeled frame, a longitudinally disposed beam, an excavating device at one side of said machine and supported by said beam, a carrier back of said excavating device and pivotally connected with said beam, two substantially parallel control bars located forward of the excavating device, said bars being connected at one end to the beam by hinged joints and at the other end by universal joints to said frame, a control bar back of said excavating device, one end of the latter bar being connected to said beam by a hinged joint and the other end thereof being connected to said frame by a universal joint, and means for vertically adjusting said excavating device.

40. An excavating and loading machine, comprising a wheeled frame, a longitudinally disposed beam, an excavating device at one side of said machine and supported by said beam, a carrier back of said excavating device and pivotally connected with said beam, two substantially parallel control bars located forward of the excavating device, said bars being connected at one end to the beam by hinged joints and at the other end by universal joints to said frame, a control bar back of said excavating device, one end of the latter bar being connected to said beam by a hinged joint and the other end thereof being connected to said frame by a universal joint, and means for independently adjusting the rear end portion of said beam vertically.

41. An excavating and loading machine, comprising a wheeled frame, a longitudinally disposed beam, an excavating device at one side of said machine and supported by said beam, a carrier back of said excavating device and pivotally connected with said beam, two substantially parallel control bars located forward of the excavating device, said bars being connected at one end to the beam by hinged joints and at the other end by universal joints to said frame, and a control bar back of said excavating device, one end of the latter bar being connected to said beam by a hinged joint and the other end thereof being connected to said frame by a universal joint, said excavating device being arranged in an angular position with reference to the line of travel.

42. An excavating and loading machine, comprising a wheeled frame, a longitudinally disposed beam, an excavating device at one side of said machine and supported by said beam, a carrier back of said excavating device and pivotally connected with said beam, two substantially parallel control bars located forward of the excavating device, said bars being connected at one end to the beam by hinged joints and at the other end by universal joints to said frame, and a control bar back of said excavating device, one end of the latter bar being connected to said beam by a hinged joint and the other end thereof being connected to said frame by a universal joint, said excavating device consisting of an upper member secured to said beam, and a scoop member secured to said upper member, said upper member being twisted so that said scoop member will occupy an angular position with relation to the line of travel.

43. An excavating machine, comprising a wheeled frame, a beam at one side thereof, an excavating device connected with said beam, transverse vertically swinging members mounted on said frame and pivotally connected with said beam in different horizontal planes, a caster wheel connected with the forward portion of said beam, and means mounted on said frame for separately adjusting the forward and rear end portions of said beam vertically.

ORTUS E. MOATS.